(12) United States Patent
Sorsby

(10) Patent No.: US 11,811,440 B2
(45) Date of Patent: Nov. 7, 2023

(54) SYSTEM AND METHOD FOR CANCELATION OF INTERNALLY GENERATED SPURIOUS SIGNALS IN A BROADBAND RADIO RECEIVER

(71) Applicant: Rockwell Collins, Inc., Cedar Rapids, IA (US)

(72) Inventor: William B. Sorsby, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/326,978

(22) Filed: May 21, 2021

(65) Prior Publication Data

US 2022/0376723 A1 Nov. 24, 2022

(51) Int. Cl.
*H04B 1/12* (2006.01)
(52) U.S. Cl.
CPC ...................... *H04B 1/12* (2013.01)
(58) Field of Classification Search
CPC ....................................................... H04B 1/12
See application file for complete search history.

(56) References Cited

U.S. PATENT DOCUMENTS

| | | | |
|---|---|---|---|
| 4,994,804 A * | 2/1991 | Sakaguchi | H03M 3/34 341/172 |
| 5,894,497 A | 4/1999 | Overton | |
| 5,966,684 A * | 10/1999 | Richardson | H04B 1/123 702/191 |
| 6,384,589 B1 | 5/2002 | Gumm et al. | |
| 6,470,047 B1 * | 10/2002 | Kleinerman | H04L 25/03267 375/232 |
| 7,176,817 B2 | 2/2007 | Jensen | |
| 8,125,363 B2 | 2/2012 | Kobata | |
| 8,576,951 B2 | 11/2013 | Mombers et al. | |
| 9,041,444 B1 | 5/2015 | Mehrabani et al. | |
| 10,523,182 B1 * | 12/2019 | Sorsby | H04B 1/123 |
| 2006/0222058 A1 * | 10/2006 | Simic | G01S 19/34 375/150 |
| 2012/0076177 A1 * | 3/2012 | Simic | H04K 3/90 375/150 |

(Continued)

FOREIGN PATENT DOCUMENTS

| | | |
|---|---|---|
| EP | 1248395 B1 | 11/2007 |
| GB | 2474186 B | 5/2013 |
| GB | 2541379 A | 2/2017 |

*Primary Examiner* — Junpeng Chen
(74) *Attorney, Agent, or Firm* — Suiter Swantz pc llo

(57) ABSTRACT

Lossless digital cancelation of internally generated spurious products within a signal receiver system is provided. In embodiments, the receiver system generates reference frequencies corresponding to internal components within the receiver (e.g., mixers, oscillators, clocks, analog-digital converters (ADC)) that introduce spurious products into the digitization of a received RF signal. The receiver system precisely duplicates each introduced spurious product based on the reference frequencies and filters out each corresponding spurious product out of the digitized signal. Individualized canceler circuits for each introduced spurious product adjust the corresponding duplicate spurious products to cancel out the introduced spurious product from the digitized signal, resulting in an output signal free of self-generated interference.

6 Claims, 6 Drawing Sheets

(56) References Cited

U.S. PATENT DOCUMENTS

| | | | |
|---|---|---|---|
| 2013/0218559 A1* | 8/2013 | Yamabe | G10L 21/0216 |
| | | | 704/226 |
| 2015/0369898 A1* | 12/2015 | Torin | G01R 25/00 |
| | | | 324/750.02 |
| 2016/0142070 A1* | 5/2016 | Wang | G06F 7/588 |
| | | | 708/250 |
| 2017/0005773 A1* | 1/2017 | Liu | H04L 5/14 |
| 2017/0244396 A1 | 8/2017 | Ficici et al. | |
| 2018/0123634 A1* | 5/2018 | Settaf | H04B 1/48 |
| 2019/0028092 A1 | 1/2019 | Lu et al. | |
| 2022/0065927 A1* | 3/2022 | de Godoy Peixoto | |
| | | | G01R 31/31709 |

* cited by examiner

SYSTEM AND METHOD FOR CANCELATION OF INTERNALLY GENERATED SPURIOUS SIGNALS IN A BROADBAND RADIO RECEIVER

TECHNICAL FIELD

The inventive concepts disclosed herein are directed generally to communications systems and more particularly software-defined radio (SDR) systems and/or data link systems capable of receiving and digitizing transmitted radio frequency (RF) signals.

BACKGROUND

Modern radio receiver systems are prone to self-generated internal interference. For example, a transmitted signal received by a radio system tuned to a given frequency (e.g., or frequency channel) may first be received by antenna elements of the radio system; the received analog signal may pass through oscillators, mixers, filters, and other internal components of the radio system before digitization by analog-digital converter (ADC) circuits within the radio system. At any or all of these stages, spurious products may be introduced into the received signal (e.g., harmonics and cross-products generated by internal clocks and oscillators; oscillator leakage signals; and/or aliasing caused by ADC interleaving), degrading overall reception.

Conventional approaches to the problem of self-generated internal interference may involve costly iterative redesigns incorporating complicated schemes for hiding expected spurious products in unwanted areas of the frequency spectrum as well as mechanical partitioning and shield fabrication to isolate receiver circuits and high-level signals. Even so, such approaches do not eliminate so much as mitigate or minimize spurious products to an acceptable extent, e.g., in compliance with performance specifications. However, spur mitigation is complicated both by increases in receiver bands and frequency spans (leaving precious little spectrum space available for hiding undesired spurs) and mechanical miniaturization (allowing little or no room for physical separation or partition). Alternatively, some conventional approaches to spurious products involve estimating and canceling out spurious products from a received signal, although this too is a mitigating approach.

SUMMARY

A spur canceler circuit for a signal receiver system is disclosed. In embodiments, the spur canceler circuit includes frequency generators for generating reference frequencies associated with internal components of the receiver system, the receiver components responsible for introducing spurious products (e.g., reference frequencies, harmonic orders, cross-products) into digitized received signals. The spur canceler circuit generates duplicate spurious products for each spurious product introduced by the system based on the reference frequencies. The spur canceler includes cancelation circuits for each introduced spurious product; each cancelation circuit receives a digitized version of the received signal. Each cancelation circuit isolates the corresponding introduced spurious product from the digitized signal and adjusts the duplicate spurious product to cancel out the introduced spurious product from the digitized signal. The adjusted duplicate spurious products are added to the digitized signal, resulting in a desired output signal free of the corresponding introduced spurious products.

In some embodiments, the duplicate spurious products include generated reference frequencies, integer multiples of reference frequencies, and cross-products of two or more reference frequencies.

In some embodiments, the spur canceler circuit adjusts the amplitude of the duplicate spurious product to match the amplitude of the corresponding introduced spurious product, and adjusts the phase of the duplicate spurious product to oppose the phase of the corresponding introduced spurious product.

In some embodiments, the receiver components include internal clocks, oscillators, and mixers within the receiver system.

In some embodiments, the receiver components include analog-digital converters (ADC) for digitizing a received RF signal.

A method for cancelation of internally generated spurious products from a received signal is also disclosed. In embodiments, the method includes receiving a transmitted RF signal, e.g., via a signal receiver system. The method includes digitizing the received signal via the receiver system, whereby the internal components of the receiver system introduce spurious products into the digitized signal. The method includes generating reference frequencies via the receiver system, the reference frequencies associated with the receiver components. The method includes generating a duplicate spurious product for each introduced spurious product based on the reference frequencies. The method includes, for each introduced spurious product: isolating the spurious product from the digitized signal, adjusting the corresponding duplicate spurious product to cancel out the introduced spurious product from the digitized signal, and adding the adjusted duplicate spurious product to the digitized signal to generate a baseband output signal from which all known spurious products have been removed.

In some embodiments, the method includes generating a duplicate spurious product based on: a reference frequency, an integer multiple of the reference frequency, or a cross product of two or more reference frequencies.

In some embodiments, the method includes adjusting the amplitude of a duplicate spurious product to align with an amplitude of its corresponding introduced spurious product, and adjusting the phase of the duplicate spurious product to oppose the phase of the corresponding introduced spurious product and thereby cancel out the introduced spurious product.

In some embodiments, the method includes generating reference frequencies associated with internal clocks, oscillators, and/or mixers within the receiver system.

In some embodiments, the method includes generating reference frequencies based on analog-digital converters (ADC) within the receiver system.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
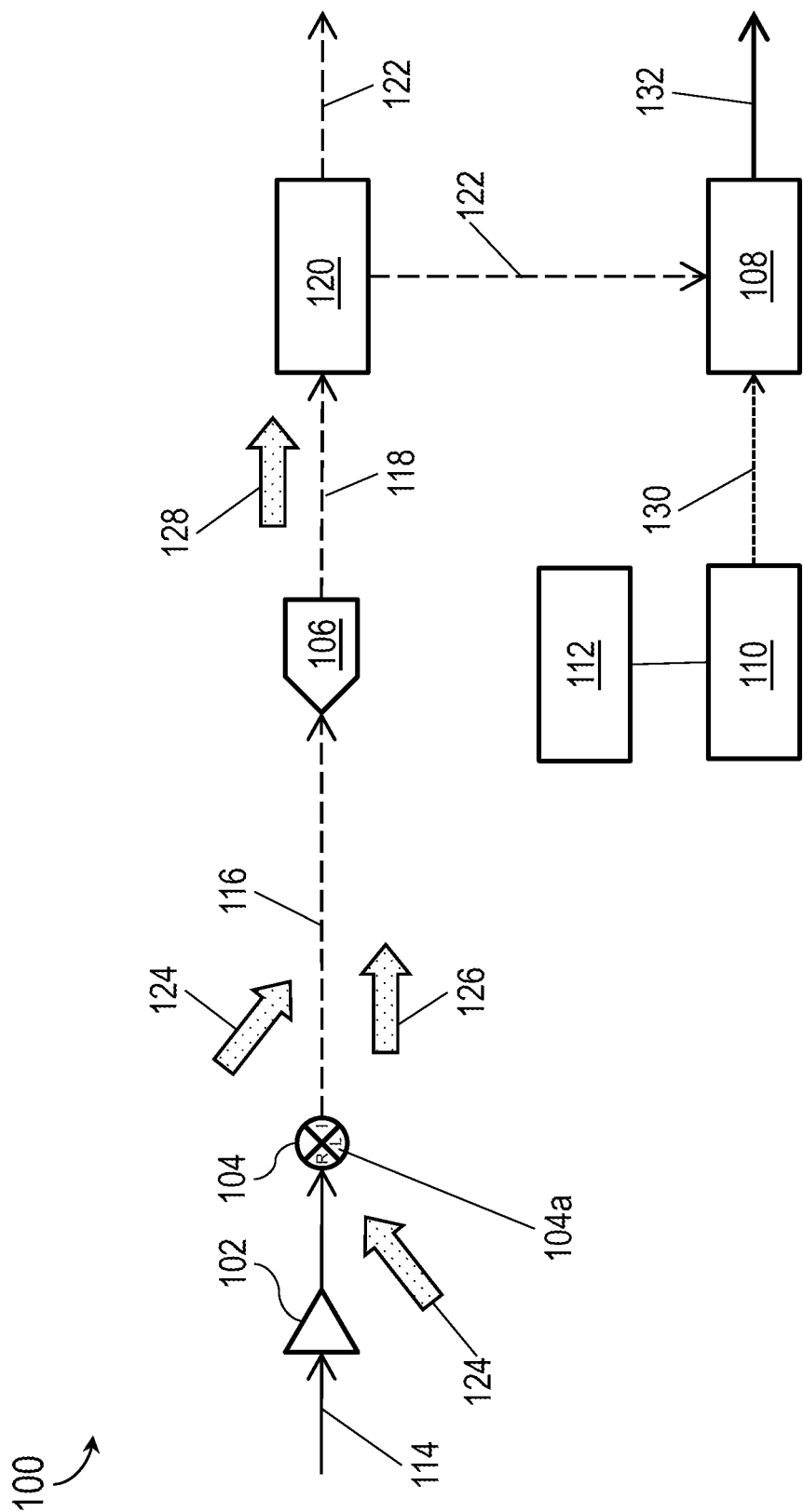
FIG. 1 is a block diagram illustrating a signal receiver system according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to circuitry and methods for lossless internal cancelation of internally generated spurious products within a radio or signal receiver system. Rather than mitigate internal spurs, either mechanically (e.g., via partitioning and/or shielding) or digitally (e.g., via attempting to estimate or predict self-generated interference), it may be possible to identify precisely the spurious products generated by specific components and generate accurate duplicates of each spurious product, thereby canceling all such spurious products out of the desired baseband signal without degrading the system noise figure.

Referring to FIG. 1, a signal receiver system 100 is disclosed. The signal receiver system 100 may include antenna elements 102, frequency mixers 104, analog-digital converters 106 (ADC), spur canceler 108 (e.g., cancelation engine), control processors 110, and memory 112.

In embodiments, the signal receiver system 100 may be tunable to any of a number of channel frequencies or frequency bands (e.g., specific step sizes within a frequency range) for the reception of transmitted radio frequency (RF) signals 114 at that frequency. For example, the received RF signal 114 may be modulated by frequency mixers 104 (e.g., including local oscillator 104a (LO)), e.g., upconverted or down-converted to an intermediate-frequency signal 116. The intermediate-frequency signal 116 may be digitized by the ADC 106, and the resulting digitized signal 118 may be further digitally down-converted (120) to generate a desired baseband signal 122.

In embodiments, the desired baseband signal 122 may include spurious products introduced into the signal at various and multiple stages of the signal path. For example, internal clocks and local oscillators 104a may introduce harmonics and cross-products 124. The local oscillators 104a may similarly introduce oscillator leakage signals 126. The ADC 106 and its internal clock may likewise introduce spurious products and aliasing 128 associated with ADC interleaving. In embodiments, as most internal clocks 108, mixers 104 and local oscillators 104a, and ADCs 106 are phase-locked in modern receiver systems 100 (e.g., radio/data link systems), the spurious products generated by these receiver components may be based in a finite and knowable group of reference frequencies (e.g., fundamental frequencies). Consequently, it may be possible to internally "ghost" or synthesize (e.g., via the spur canceler 108) duplicate spurs corresponding to each introduced spurious product (124, 126, 128) within the radio system 100 via digital signal processing.

In embodiments, the control processors (110) may be programmed to generate a duplicate spurious product (e.g., duplicate spur) corresponding to each introduced spurious product (124, 126, 128) within the receiver system 100. For example, as noted above each introduced spurious product may be precisely characterized by constituent reference frequencies, harmonic orders and cross-products (124, 126, 128). These reference frequencies, harmonic orders and cross-products 124, 126, 128 are stored in memory 112 to allow exact duplication of an introduced spurious product which will cancel out the corresponding interfering signal (e.g., from the desired baseband signal 122).

In embodiments, the generated duplicate spurious products may serve as a reference input 130 to the spur canceler 108, which may remove each introduced spurious product 124, 126, 128 from the desired baseband signal 122 to generate a desired output signal 132, e.g., a baseband signal corresponding to the received RF signal 114 but free of undesired internally introduced spurious frequencies and components (124, 126, 128).

Figure 2:
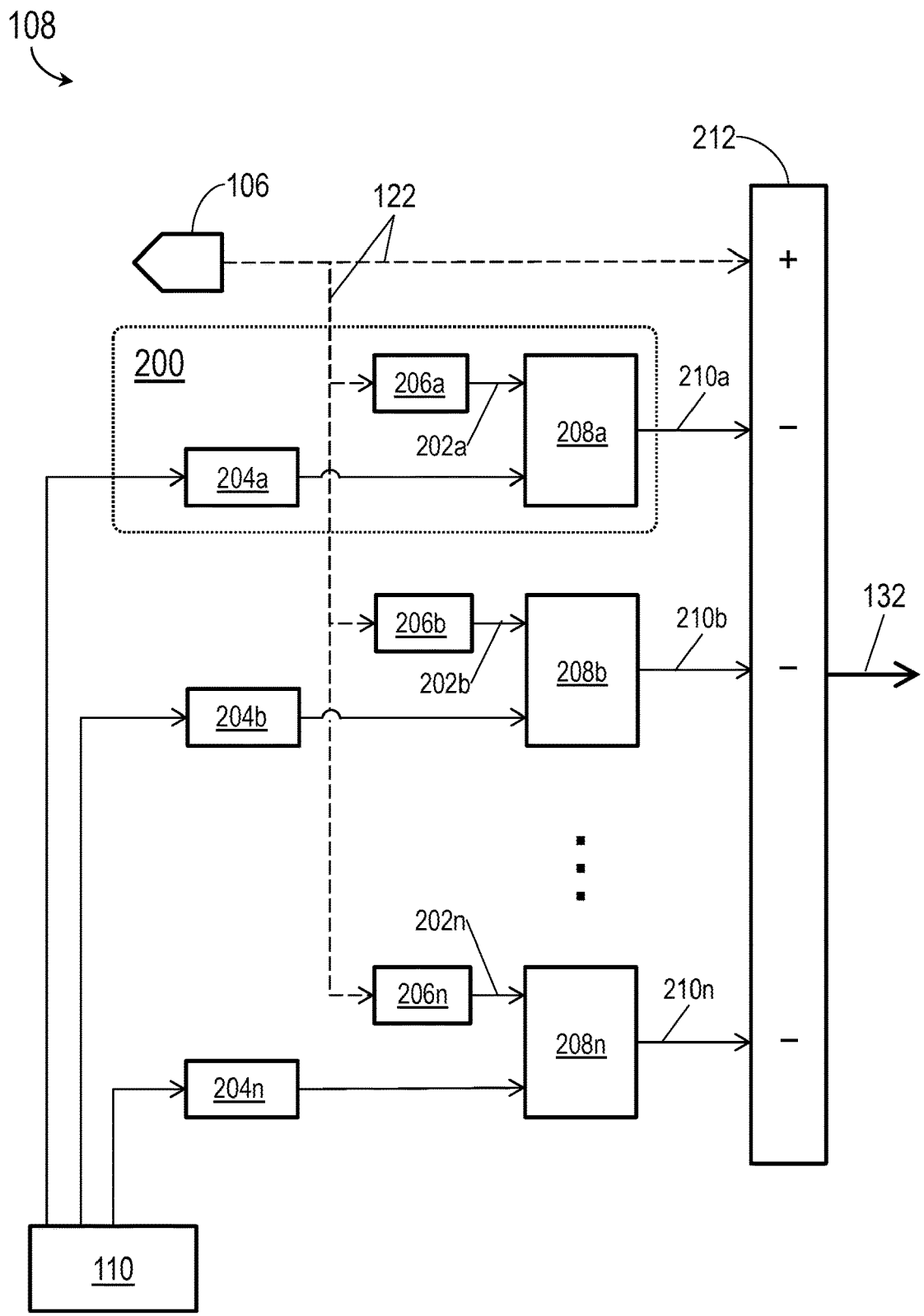
FIG. 2 is a block diagram illustrating an internal spur canceler of the signal receiver system of FIG. 1.

Referring now to FIG. 2, the spur canceler 108 is shown. The spur canceler 108 may include a cancelation circuit 200 (e.g., cancelation path) for each introduced spurious product (124, 126, 128; FIG. 1) to be duplicated and eliminated from the desired baseband signal 122 to produce the desired output signal 132.

In embodiments, the control processors 110 may be preprogrammed to identify N specific introduced spurious products A, B, . . . N (202a-n) to be removed from the desired baseband signal 122, the introduced spurious products 202a-n comprising the known reference frequencies, harmonic orders and cross-products (124, 126, 128; FIG. 1) associated with the embodying receiver system (100, FIG. 1). Accordingly, each introduced spurious product 202a-n may either correspond to a reference frequency $F_1, F_2, \ldots F_M$ associated with the receiver system 100 or be characterized as 1) a cross-product of two or more reference frequencies (e.g., $A=aF_1+bF_2$) or 2) an integer multiple of an underlying reference frequency (e.g., common denominator; $B=cF_2+yF_2=(c+y)F_2$, e.g., even if the reference local oscillator (104a, FIG. 1) should drift off its nominal center frequency ($F_{LO}$).

In embodiments, should the internal components of the receiver system 100 (e.g., antenna elements (102, FIG. 1), frequency mixers (104, FIG. 1), ADCs (106, FIG. 1) change in any way, the control processors 110 may be reprogrammed to identify and duplicate any new or changed introduced spurious products 124, 126, 128 generated by the receiver system 100.

In embodiments, the control processors 110 may generate a duplicate spurious product 204a, 204b, . . . 204n corresponding to each introduced spurious product 202a, 202b, . . . 202n. For example, the cancelation circuit 200 dedicated to each introduced spurious product 202a-n may receive the duplicate spurious product 204a-n corresponding to that spurious product. In embodiments, each cancelation circuit 200 may receive a copy of the desired baseband signal 122 and may isolate therefrom the corresponding introduced spurious product 202a-n, e.g., via filters 206a-n (e.g., low pass filters). Each cancelation circuit 200 may adjust (208a-n) its corresponding duplicate spurious product 204a-n based on the corresponding introduced spurious product 202a-n to generate a cancelation signal 210a-n corresponding to the introduced spurious product.

In embodiments, the spur canceler 108 may include adders 212 for adding each cancelation signal 210a-n to the desired baseband signal 122, canceling out the corresponding introduced spurious product 202a-n from the desired baseband signal 122 and generating a desired output signal 132 free of self-generated interference.

Figure 3:
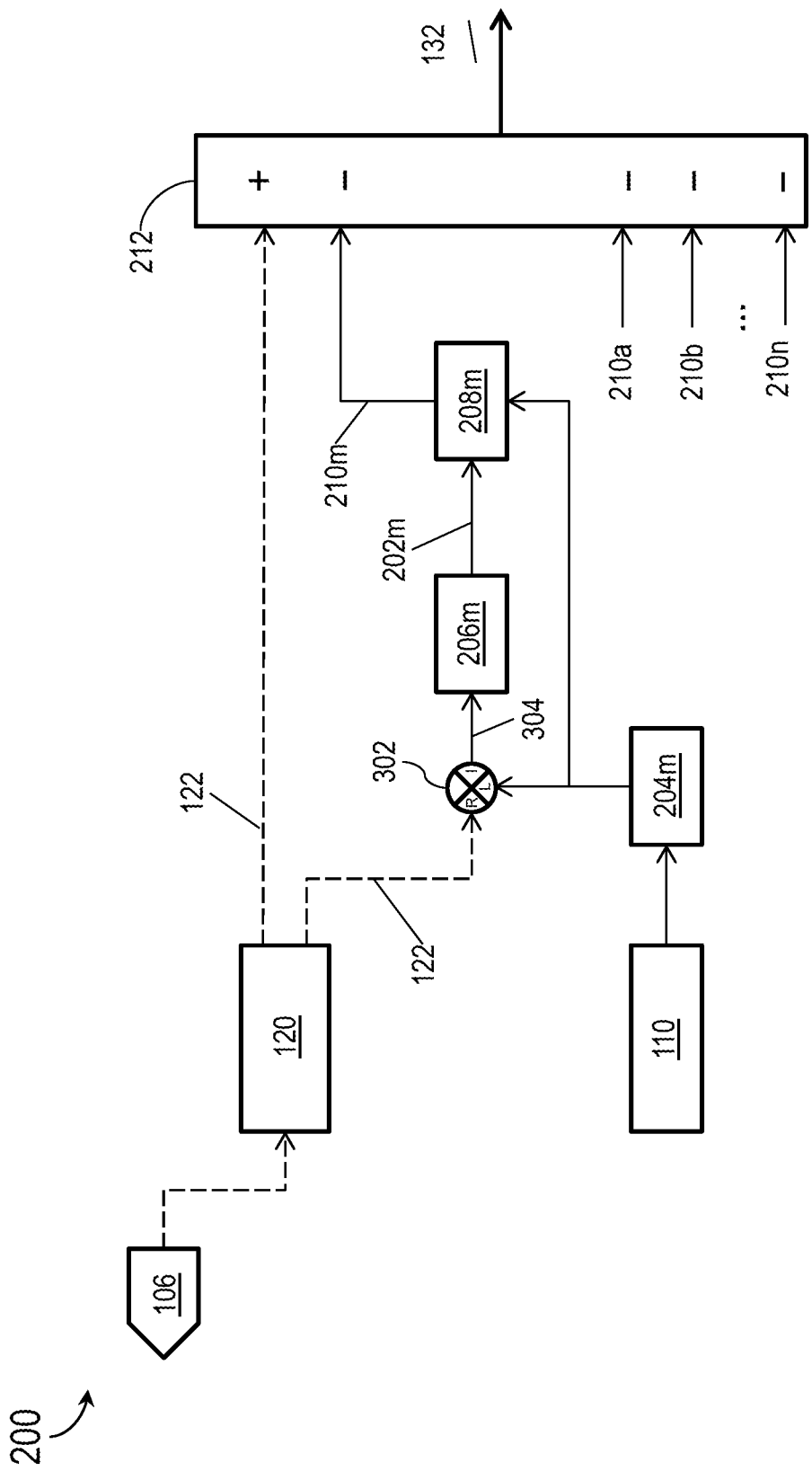
FIG. 3 is a block diagram illustrating in detail an individual canceler circuit of the internal spur canceler of FIG. 2.

Referring to FIG. 3, the cancelation circuit 200 is shown.

In embodiments, each cancelation circuit 200 may be configured to remove a particular introduced spurious product 202m from the desired baseband signal 122. For example, the cancelation circuit 200 may receive a copy of the desired baseband signal 122 (e.g., as digitized by the ADC 106 and digitally down-converted (120)) and a duplicate spurious product 204m corresponding to the introduced spurious product 202m (e.g., generated from the same reference frequencies as described above). The desired baseband signal 122 may be run through a phase detector 302 (e.g., a frequency mixer with the duplicate spurious product 204m as a local oscillator frequency, such that the output intermediate frequency 304 represents a phase difference between the desired baseband signal 122 and the duplicate spurious product 204m) and filtered (206m) to isolate the corresponding introduced spurious product 202m. In embodiments, the cancelation circuit 200 may adjust (208m) the phase and amplitude of the duplicate spurious product 204m based on the introduced spurious product 202m, such that the resulting cancelation signal 210m, when added (212) to the desired baseband signal (e.g., along with other cancelation signals 210a-n), cancels out its corresponding introduced spurious product 202m, resulting in a desired output signal 132 free of self-generated interference.

Figure 4B:
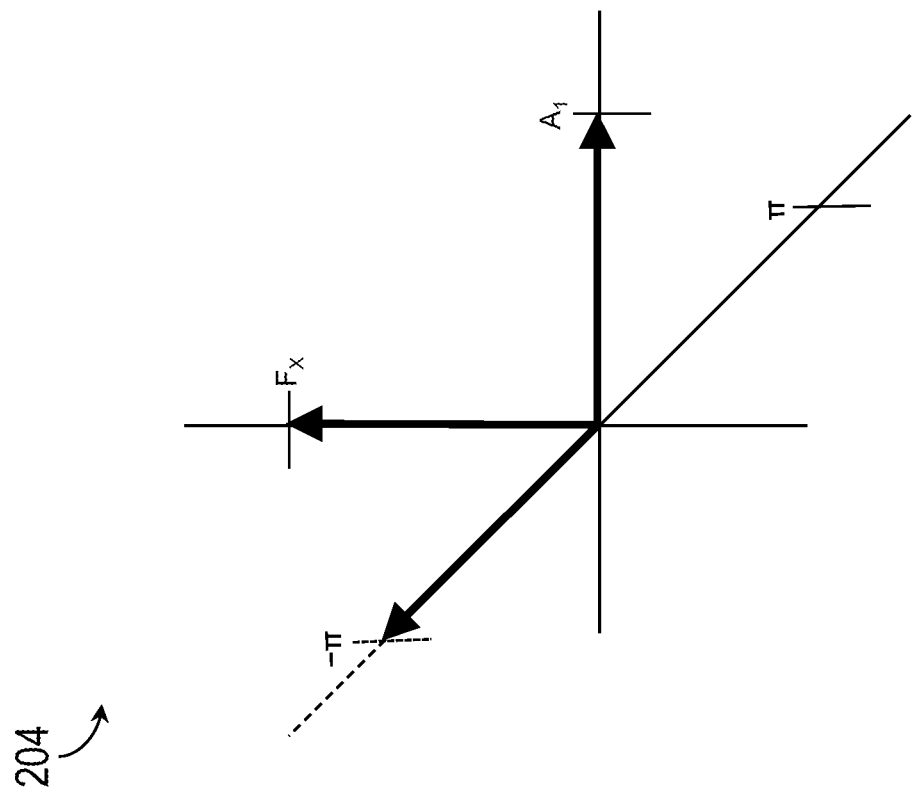
FIG. 4B is a graphical illustration of a duplicate spur generated by the internal spur canceler of FIG. 2.
Figure 4A:
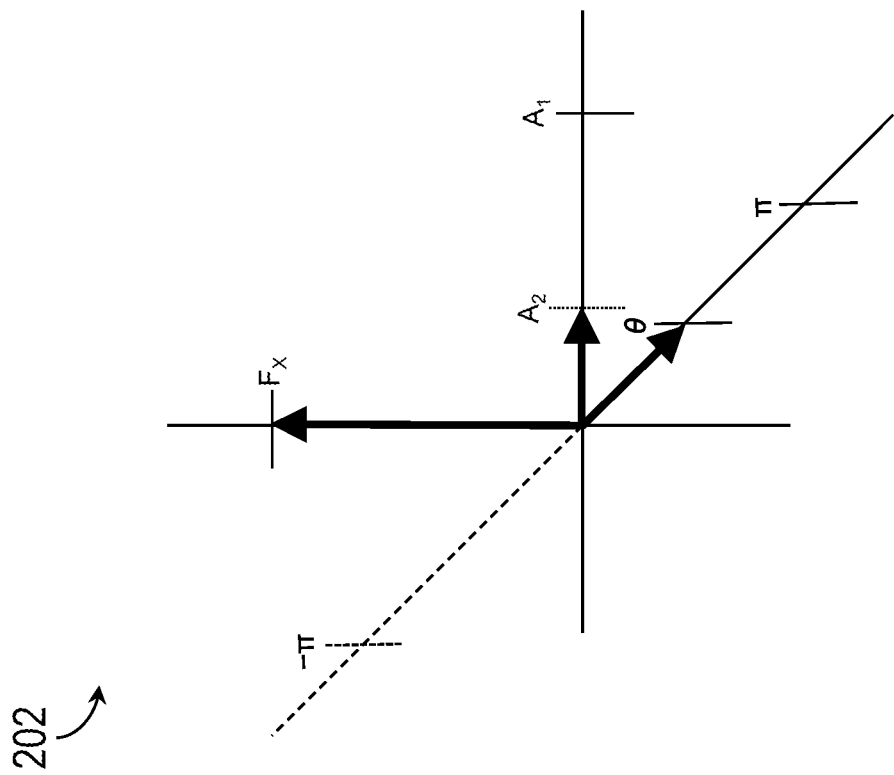
FIG. 4A is a graphical illustration of a spurious product to be canceled by the canceler circuit of FIG. 3.

Referring now to FIGS. 4A and 4B, the introduced spurious product 202 and a corresponding duplicate spurious product 204 generated by the spur canceler (108, FIG. 1) are shown before adjustment (208a-m, FIG. 3) by the canceler circuit (200, FIG. 3).

In embodiments, the introduced spurious product 202 and duplicate spurious product 204 may be of like frequency $F_X$. For example, as noted above the introduced spurious product 202 may be known to be of a particular reference frequency, a multiple of said reference frequency, or a cross product of two or more reference frequencies. Accordingly, the duplicate spurious product 204 may be generated at precisely the same reference frequency $F_X$ as the introduced spurious product 202. However, the duplicate spurious product 204 and introduced spurious product 202 may yet differ in terms of their phase and/or amplitude. For example, the duplicate spurious product 204 may be generated with nominal phase $-\pi$ and nominal amplitude $A_1$, while the introduced spurious product 202 may have a phase $\theta$ and amplitude $A_2$ (e.g., detectable by the canceler circuit 200 as described above).

Figure 4D:
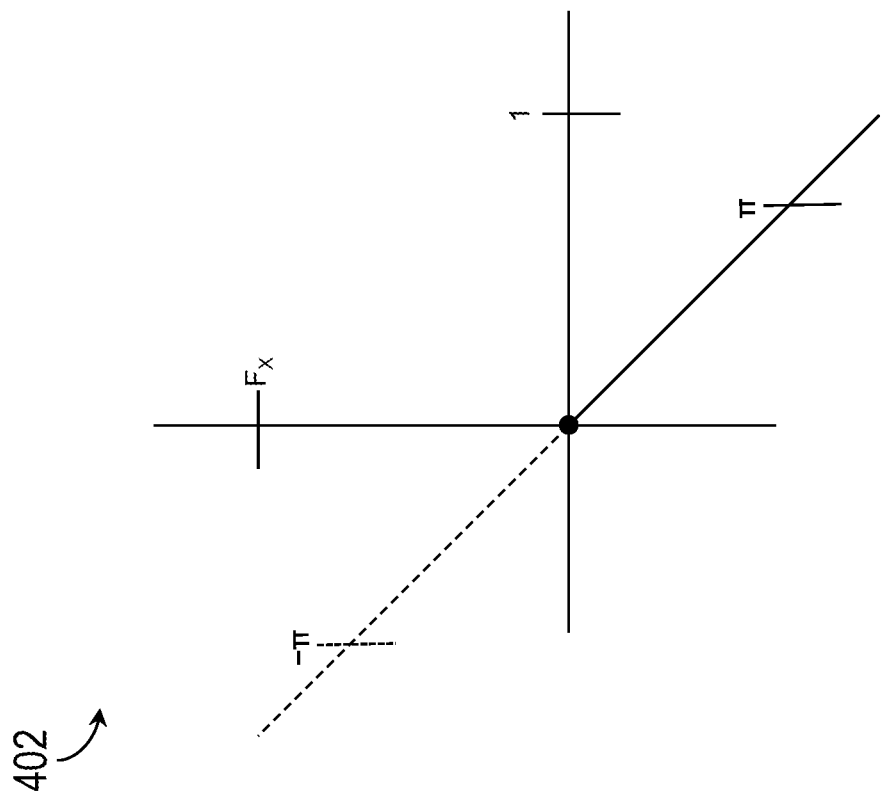
FIG. 4D is a graphical illustration of the spurious product of FIG. 4A as canceled by the internal spur canceler of FIG. 2.
Figure 4C:
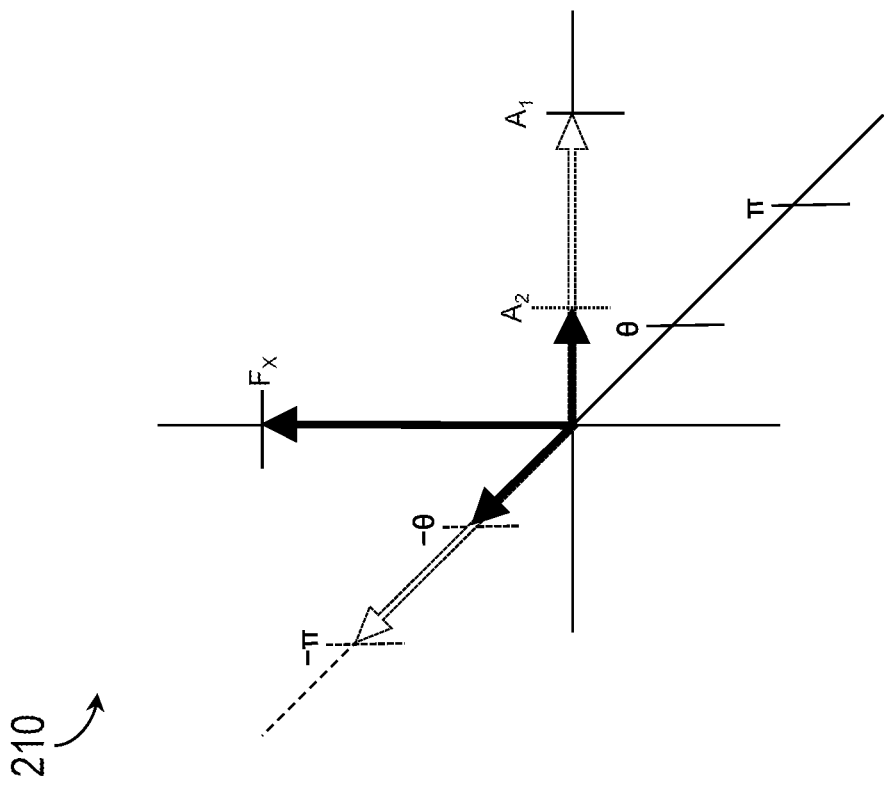
FIG. 4C is a graphical illustration of the duplicate spur of FIG. 4B adjusted by the canceler circuit of FIG. 3.

Referring to FIG. 4C, the cancelation signal 210 may be implemented and may function similarly to the duplicate spurious product 204 of FIG. 4B, except that the cancelation signal 210 may reflect adjustments (208a-m) to the duplicate spurious product 204 of FIG. 4B based on the detected phase and/or amplitude of the introduced spurious product 202 of FIG. 4A. For example, the amplitude of the cancelation signal 210 may be adjusted from $A_1$ (204, FIG. 4B) to $A_2$ to match the introduced spurious product 202. Similarly, the phase of the cancelation signal 210 may be adjusted from $-\pi$ (204, FIG. 4B) to $-\theta$, the opposite of the phase $\theta$ of the introduced spurious product 202.

Referring to FIG. 4D, the canceled spurious product 402 may be implemented and may function similarly to the introduced spurious product 202 of FIG. 4A, except that the canceled spurious product may reflect the addition of the cancelation signal 210 of FIG. 4C to the desired baseband signal (122, FIG. 3). For example, by adding the cancelation signal 210 to the desired baseband signal 122, the introduced spurious product 202 (having like frequency and amplitude with, but opposed in phase to, the cancelation signal) may be completely canceled out of the resulting desired output signal (132, FIG. 3).

Figure 5:
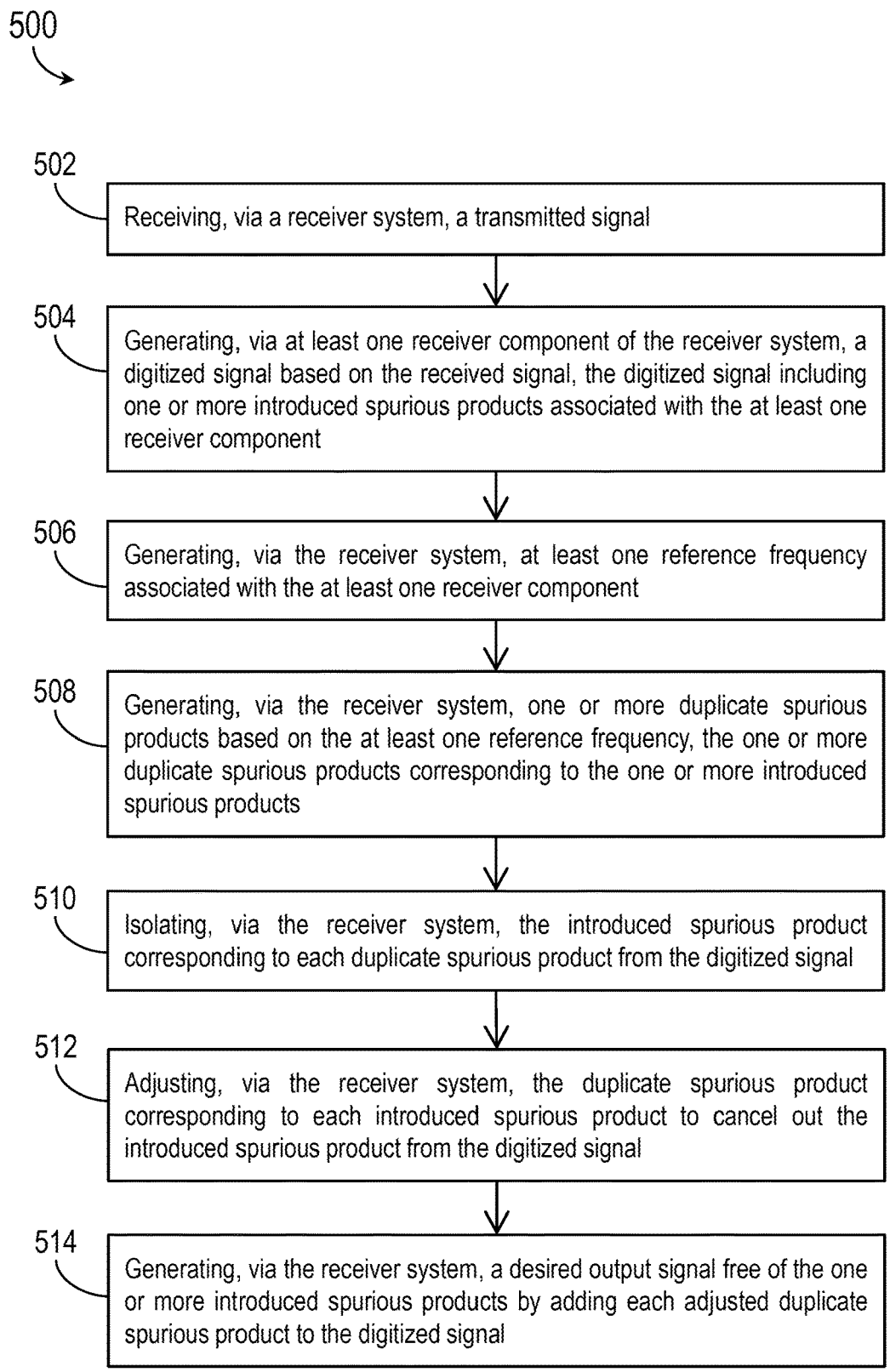
FIG. 5 is a flow diagram illustrating a method for cancelation of internally introduced spurious products from a received signal according to example embodiments of this disclosure.

Referring now to FIG. 5, the method 500 may be implemented by the receiver system 100 and may include the following steps.

At a step 502, the receiver system receives a transmitted RF signal.

At a step 504, internal receiver components of the receiver system digitize the received signal. For example, the receiver components may perform additional signal processing reflected in the digitized signal, and may introduce spurious products into the digitized signal. Receiver components may include phase-locked local oscillators, mixers, and internal clocks as well as analog-digital converters (ADC) and internal clocks thereof.

At a step 506, the receiver system generates one or more reference frequencies, each reference frequency associated with introduced spurious products associated with the receiver system.

At a step 508, the receiver system generates duplicate spurious products based on the reference frequencies. For example, each duplicate spurious product may duplicate a particular introduced spurious product found within the digitized signal. Each duplicate spurious product may be a signal of a particular reference frequency or an integer multiple of the reference frequency, or the duplicate spurious product may be a cross product of two or more different reference frequencies.

At a step 510, the receiver system may isolate each introduced spurious product from the digitized signal, e.g., via individual canceler circuits dedicated to each introduced spurious product.

At a step 512, the receiver system generates cancelation signals by adjusting each duplicate spurious product based on its corresponding introduced spurious product. For example, a duplicate spurious product of like frequency with its counterpart introduced spurious product may be adjusted in amplitude to match, and adjusted in phase to oppose, the introduced spurious product.

At a step 514, the receiver system generates an interference-free desired output signal by adding each cancelation signal to the digitized signal, canceling out each corresponding introduced spurious product from the signal.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A spur canceler circuit for a signal receiver system, comprising:
    at least one frequency generator configured to:
        generate at least one reference frequency associated with a plurality of receiver components of the receiver system, the plurality of receiver components capable of introducing a plurality of spurious products into a signal received by the receiver system, the plurality of receiver components including an analog-digital converter (ADC) configured to generate a digitized signal based on the received signal and capable of introducing a first spurious product, the plurality of receiver components of the receiver system including at least one internal clock capable of introducing a second spurious product, the plurality of receiver components including an oscillator capable of introducing a third spurious product, wherein the first spurious product, the second spurious product, and the third spurious product are generated based on the at least one reference frequency, one or more harmonic orders, and one or more cross-products, the at least one reference frequency, the one or more harmonic orders, and the one or more cross-products being stored in memory to allow exact duplication, and
        generate a plurality of duplicate spurious products based on the at least one reference frequency, the one or more harmonic order, and the one or more cross-products, a first duplicate spurious product of the plurality of duplicate spurious products corresponding to the first spurious product, a second duplicate spurious product of the plurality of duplicate spurious products corresponding to the second spurious product, a third duplicate spurious product of the plurality of duplicate spurious products corresponding to the third spurious product; and
    at least one canceler circuit configured to:
        receive the plurality of digitized signals corresponding to the received signal and including the plurality of introduced spurious products;
        for each introduced spurious product, 1) isolate the introduced spurious product from the digitized signal and 2) adjust the corresponding duplicate spurious product to cancel out the introduced spurious product from the digitized signal; and
        generate a desired output signal free of the introduced spurious products by adding each adjusted duplicate spurious product to the digitized signal.

2. The spur canceler circuit of claim 1, wherein each duplicate spurious product is selected from a group including:
    a generated reference frequency;
    a multiple of a reference frequency;
    or
    a cross product of two or more reference frequencies.

3. The spur canceler circuit of claim 1, wherein the at least one canceler circuit is configured for at least one of:
    adjusting an amplitude of the duplicate spurious product to align with an amplitude of the corresponding introduced spurious product;

or
adjusting a phase of the duplicate spurious product to oppose a phase of the corresponding introduced spurious product.

4. A method for cancelation of internally generated spurious products from a received signal, comprising:
receiving, via a receiver system, a transmitted signal;
generating, via a plurality of receiver components of the receiver system, a plurality of digitized signals based on the received signal, the plurality of digitized signals including a plurality of introduced spurious products associated with the plurality of receiver components, the plurality of receiver components including an analog-digital converter (ADC) configured to generate a digitized signal based on the received signal and capable of introducing a first internal spurious product, the plurality of receiver components of the receiver system including at least one internal clock capable of introducing a second spurious product, the plurality of receiver components including an oscillator capable of introducing a third spurious product;
generating, via the receiver system, at least one reference frequency associated with the plurality of receiver components, wherein the first spurious product, the second spurious product, and the third spurious product are generated based on the at least one reference frequency, one or more harmonic orders, and one or more cross-products, the at least one reference frequency, the one or more harmonic orders, and the one or more cross-products being stored in memory to allow exact duplication;
generating, via the receiver system, a plurality of duplicate spurious products based on the at least one reference frequency, the one or more harmonic order, and the one or more cross-products, a first duplicate spurious product of the plurality of duplicate spurious products corresponding to the first spurious product, a second duplicate spurious product of the plurality of duplicate spurious products corresponding to the second spurious product, a third duplicate spurious product of the plurality of duplicate spurious products corresponding to the third spurious product;
isolating, via the receiver system, each introduced spurious product from the digitized signal;
adjusting, via the receiver system, the duplicate spurious product corresponding to each introduced spurious product to cancel out the introduced spurious product from the digitized signal;
and
generating, via the receiver system, a desired output signal free of the plurality of introduced spurious products by adding each adjusted duplicate spurious product to the digitized signal.

5. The method of claim 4, wherein generating, via the receiver system, a plurality of duplicate spurious products based on the at least one reference frequency includes:
generating the plurality of duplicate spurious products, each duplicate spurious product selected from a group including:
a generated reference frequency;
a multiple of a reference frequency;
or
a cross product of two or more reference frequencies.

6. The method of claim 4, wherein adjusting, via the receiver system, the duplicate spurious product corresponding to each introduced spurious product to cancel out the introduced spurious product from the digitized signal is selected from a group including:
adjusting an amplitude of the duplicate spurious product to align with an amplitude of the corresponding introduced spurious product;
or
adjusting a phase of the duplicate spurious product to oppose a phase of the corresponding introduced spurious product.

* * * * *